(12) United States Patent
Seki

(10) Patent No.: US 7,780,297 B2
(45) Date of Patent: Aug. 24, 2010

(54) SCREEN, REAR PROJECTOR AND IMAGE DISPLAY APPARATUS WITH DEFORMABLE SCATTERING COMPONENTS

(75) Inventor: Hideya Seki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 649 days.

(21) Appl. No.: 11/760,839

(22) Filed: Jun. 11, 2007

(65) Prior Publication Data

US 2008/0062517 A1    Mar. 13, 2008

(30) Foreign Application Priority Data

Jun. 14, 2006 (JP) .............................. 2006-164649

(51) Int. Cl.
G03B 21/14 (2006.01)
G03B 21/60 (2006.01)
(52) U.S. Cl. .................... 353/79; 353/122; 359/452
(58) Field of Classification Search .................. 353/54, 353/79, 28, 37, 122; 359/446, 452, 453
See application file for complete search history.

(56) References Cited

U.S. PATENT DOCUMENTS

| 4,401,368 A | 8/1983 | Drechsel et al. |
| 6,092,900 A * | 7/2000 | Diedrich et al. ............. 353/122 |
| 6,426,836 B2 | 7/2002 | Dorsel et al. |
| 6,940,644 B2 * | 9/2005 | Honda et al. ................. 359/453 |

FOREIGN PATENT DOCUMENTS

| JP | A-57-124724 | 8/1982 |
| JP | A-10-115805 | 5/1998 |
| JP | A 11-038512 | 2/1999 |
| JP | A 2001-100316 | 4/2001 |

* cited by examiner

*Primary Examiner*—Thanh X Luu
(74) *Attorney, Agent, or Firm*—Oliff & Berridge, PLC

(57) ABSTRACT

A screen that receives projected light beams to display an image includes: a plurality of light-transmissive plates having optical transparency; a fluid that is disposed within a light scattering space formed between the light-transmissive plates and contains at least one of gas and liquid; and scattering components that are disposed within the light scattering space and are deformable according to an atmosphere change of the fluid.

10 Claims, 13 Drawing Sheets

SCREEN, REAR PROJECTOR AND IMAGE DISPLAY APPARATUS WITH DEFORMABLE SCATTERING COMPONENTS

BACKGROUND

1. Technical Field

The present invention relates to a screen, a rear projector, and an image display apparatus.

2. Related Art

In recent years, a projector has come into wide use. In addition to a front projection type projector that is used mainly for business presentation, there is recently growing the recognition of a rear projection type projector as a form of a large-sized television (PTV: projection television). The biggest advantage of a projection type display apparatus is that the projection type display apparatus can provide a screen having the same size as direct view type displays, such as a liquid crystal television or a PDP, with a low cost as compared with the direct view type displays. However, as the direct view type displays are also becoming cheap, high resolution and performance are requested even to projection type display apparatuses.

A projector illuminates light emitted from a light source, such as an arc lamp, onto a light modulation element, such as a liquid crystal light valve and projects projected light modulated by the light modulation element onto a screen, such that an image is displayed on the screen. At this time, while an image is being displayed on the screen, the entire surface of the screen glares. This occurs due to brightness unevenness according to interference of light beams and is called spectral noises, so-called scintillation.

Here, a principle of occurrence of the scintillation will be described.

As shown in FIGS. 18A and 18B, light beams emitted from a light source 70 are transmitted through a liquid crystal light valve and are then projected onto a screen 74. The projected light beams projected onto the screen 74 are diffracted by scattering components 72 contained in the screen 74. Then, the diffracted light beams move like secondary wave sources to be diffused. As shown in FIG. 18B, two spherical waves of the secondary wave sources strengthen or weaken each other depending on the phase relationship between the two waves. As a result, the spherical waves appear as bright and dark fringe patterns (interference fringes) between the screen 74 and a viewer. When eyes of the viewer focus on an image surface S on which the interference fringes occur, the viewer recognizes the interference fringes as scintillation that causes the screen to glare.

The scintillation gives a viewer, who desires to see an image formed on the screen surface, an unpleasant feeling as if a veil, a lace cloth, or a cobweb exists between the screen surface and the viewer. In addition, since the viewer sees double images including an image on the screen and the scintillation, the eyes of the viewer desire to focus on both the images, which causes the viewer to feel fatigued. Accordingly, the scintillation causes the viewer to be so stressful that the viewer cannot stand.

In recent years, a new light source that will substitute for a known high-pressure mercury lamp is under development. In particular, expectation on a laser light source serving as a next-generation light source for a projector is increasing in terms of energy efficiency, color reproduction, long life, instantaneous lighting, and the like. However, light beams that are projected onto a screen by a laser light source have very high coherency because phases of light beams in adjacent regions are equal to each other. The coherent length of the laser light source may be several tens of meters. Accordingly, in the case when light beams emitted from the same light source are split and are then combined again, light beams that are combined through an optical path difference shorter than the coherent length cause strong interference. As a result, scintillation (interference fringes) occurs more definitely than a case of the high-pressure mercury lamp.

For this reason, a technique for reducing the scintillation is essential particularly in making a projector using a laser light source.

The following techniques are disclosed as measures for reducing the scintillation.

JP-A-11-038512 discloses a screen having a three-layered structure including a diffusion layer, a transparent (lenticular lens), and a diffusion layer, thereby optimizing a diffusing property of the screen. Thus, in the case when a scattering layer is complicated, the random property of interference spots increases. For this reason, if fine components (interference fringes having small spatial frequencies) of the spots increase, there may occur an effect that light beams are integrated and averaged due to an afterimage characteristic of human eyes when the eyes are averted. In particular, since the eyes are frequently averted in the case of watching moving pictures, reduction of scintillation may be expected.

JP-A-2001-100316 discloses a screen in which light beams, electric field, magnetic field, heat, stress, and the like are applied to a light scattering layer such that the shape, relative position, or refractive index of a light scattering body contained in the light diffusion layer change with time. Thus, by causing the scattering distribution or phases of scattered waves to change with time by the use of the light diffusion layer, it may be possible to expect occurrence of the scintillation to be prevented.

However, in JP-A-11-38512, a scattering state of a last scattering surface is fixed. Accordingly, the phase distribution of a space between a viewer and a screen, on which interference between light beams generated from points on a scattering surface occurs, is also fixed. As a result, an interference spot is also viewed as a fixed image. That is, the interference spots do not completely disappear. In addition, the screen is not effective particularly in a projector including a laser light source that is highly coherent. In addition, in the configuration using the high scattering property, an image may be defocused. Accordingly, an original purpose for realizing a high-quality image cannot be solved.

Further, in JP-A-2001-100316, a great amount of driving energy is needed to change the shape, relative position, or refractive index of a light scattering body. Furthermore, in the case of using the driving units, the efficiency of transmission of energy to the scattering layers is low and vibration, noise, unnecessary electromagnetic waves, and exhaust heat occur, which may disturb a viewer who wants a pleasant watching environment. Moreover, in the configuration in which the light scattering layer moves in the focusing direction, the size of an image changes. Accordingly, an outline of the image in the horizontal direction also changes, which causes an image to be defocused.

SUMMARY

An advantage of some aspects of the invention is that it provides a screen, a rear projector, and an image display apparatus capable of obtaining a high-quality image with a small amount of energy and noise by reliably preventing scintillation occurring due to projected light beams to avoid occurrence of display unevenness or glare.

In order to solve the above problems, according to an aspect of the invention, a screen that receives projected light beams to display an image includes: a plurality of light-transmissive plates having optical transparency; a fluid that is disposed within a light scattering space formed between the light-transmissive plates and contains at least one of gas and liquid; and scattering components that are disposed within the light scattering space and are deformable according to an atmosphere change of the fluid.

In the screen described above, due to the scattering components that are deformable according to the change of temperature or humidity within the light scattering space, projected light beams are scattered and diffracted and the scattering state of the projected light beams changes in a variety of manners. Accordingly, interference fringes that are viewed move or a pattern of the interference fringes changes in a complicated manner. As a result, the projected light beams are integrated and averaged due to an afterimage characteristic of human eyes, such that the interference fringes are not visible. That is, since an image is held for a predetermined period of time due to the afterimage, the image is evenly displayed to be viewed to human eyes. This eliminates the interference fringes occurring between a screen and a viewer, resulting in reduction of scintillation. As a result, an unpleasant feeling (display unevenness or glare) due to the scintillation is eliminated and the viewer is less fatigued. In addition, since defocusing of an image due to scattering of light does not occur, an image generated by the projected light beams is satisfactorily viewed. In such manner, it is possible to obtain an image with high brightness, high resolution, and high quality.

In addition, since the scattering components are deformable according to the change of temperature or humidity, there is little energy consumption or noises. In addition, since it is not necessary to move a screen unlike a related art, it is possible to save cost and to improve the performance of a product.

In the screen described above, preferably, the atmosphere change is a temperature change.

According to the configuration described above, the scattering components can be deformed according to the temperature change of the fluid. Thus, the pattern of interference fringes changes in a complicated manner, which makes it possible to reduce the scintillation.

Further, in the screen described above, preferably, each of the scattering components is a filler including a plurality of metal layers having different coefficients of thermal expansion.

According to the configuration described above, each of the scattering components is deformed while a metal layer having a high coefficient of thermal expansion expands and a metal layer having a low coefficient of thermal expansion contracts according to the temperature change of the fluid. Thus, by adjusting a level (temperature within the light scattering space) of change of the temperature of the scattering component, it is possible to change the shapes of a plurality of scattering components at a time.

Furthermore, in the screen described above, preferably, the atmosphere change is a humidity change.

According to the configuration described above, the scattering components can be deformed according to the humidity change of the fluid. Thus, the pattern of interference fringes changes in a complicated manner, which makes it possible to reduce the scintillation.

Furthermore, in the screen described above, preferably, each of the scattering components is a filler including a plurality of resin layers having different coefficients of hygroscopic expansion.

According to the configuration described above, each of the scattering components is deformed while moisture absorption and moisture evaporation corresponding to the humidity gradient within the light scattering space are repeatedly performed according to the humidity change of the fluid such that a resin having a high coefficient of hygroscopic expansion expands and a resin having a low coefficient of hygroscopic expansion contracts. Thus, by adjusting the humidity within the light scattering space, it is possible to change the shapes of the plurality of scattering components at a time.

Furthermore, in the screen described above, preferably, the scattering components move along flow of the fluid.

According to the configuration described above, since the scattering components move along the flow of the fluid while being deformed, it is possible to make the pattern change of interference fringes complicated. As a result, it is possible to effectively reduce the scintillation.

Furthermore, in the screen described above, preferably, the scattering component is fixed within the light scattering space.

According to the configuration described above, the scattering components are uniformly fixed beforehand in the plane direction of the screen. It is possible to prevent the scattering components from being deflected or deformation thereof from being inhibited due to interference therebetween.

Furthermore, in the screen described above, it is preferable to further include a flowing unit that causes the fluid to flow within the light scattering space.

According to the configuration described above, gradient due to change of temperature or humidity can be created and the gradient can be appropriately adjusted.

Furthermore, in the screen described above, it is preferable to further include a heating unit that heats the fluid.

According to the configuration described above, it is possible to appropriately change the temperature of the fluid so that the scattering components can be deformed effectively and reliably.

Furthermore, in the screen described above, preferably, inclusion is liquid and a heating unit that heats the fluid is further included.

In the configuration described above, for example, when liquid (fluid) evaporates due to the heating unit, the light scattering space is filled with vapor (fluid). Then, corresponding to the humidity change within the light scattering space, the scattering components deform while repeating moisture absorption and moisture evaporation. In this case, since it is possible to cause the humidity within the light scattering space to fluctuate (period of humidity change) by adjusting heating temperature of the heating unit, it is possible to cause the scattering components to deform or return to original shapes. Thus, the scattering state of projected light changes in a complicated mariner at a speed of afterimage time of human eyes, and accordingly, it is possible to view an image with high brightness and high resolution.

Furthermore, in the screen described above, preferably, the scattering component is smaller than a pixel.

According to the configuration described above, since brightness unevenness is eliminated, the contrast of an image can be improved.

In addition, according to another aspect of the invention, a rear projector includes: a light source that emits light beams;

a light modulation element that modulates the light beams emitted from the light source; the screen described above; and a projection unit that projects the light beams modulated by the light modulation element onto the screen.

In the rear projector described above, since the screen described above is included, it is possible to reliably reduce the scintillation. In addition, it is possible to provide a rear projector capable of obtaining a high-quality projected image by suppressing defocusing of an image, ghost, glare, and the like from occurring.

In addition, according to still another aspect of the invention, an image display apparatus includes: a light source that emits light beams; the screen described above; and a scanning unit that scans the light beams emitted from the light source onto the screen.

In the invention, since the screen described above is included, it is possible to provide the image display apparatus capable of reducing the scintillation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
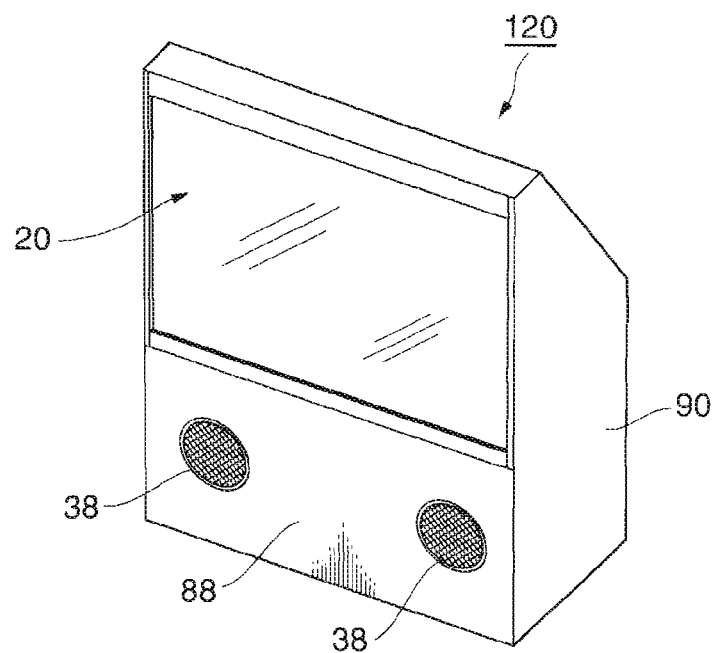
FIG. 1A is a view schematically illustrating the configuration of a rear projector according to an embodiment of the invention.

Hereinafter, preferred embodiments of the invention will be described with reference to the accompanying drawings. Moreover, in the drawings used in the following description, the scale of each member is appropriately adjusted so as to be easily recognizable. In addition, in the following description, an xyz orthogonal coordinate system is set. Referring to the xyz orthogonal coordinate system, the positional relationship among members will be described. In addition, it is assumed that a predetermined direction within a horizontal plane is an x direction, a direction orthogonal to the x direction within the horizontal plane is a y direction, and a direction orthogonal to the x and y directions is a z direction.

First Embodiment

Figure 1B:
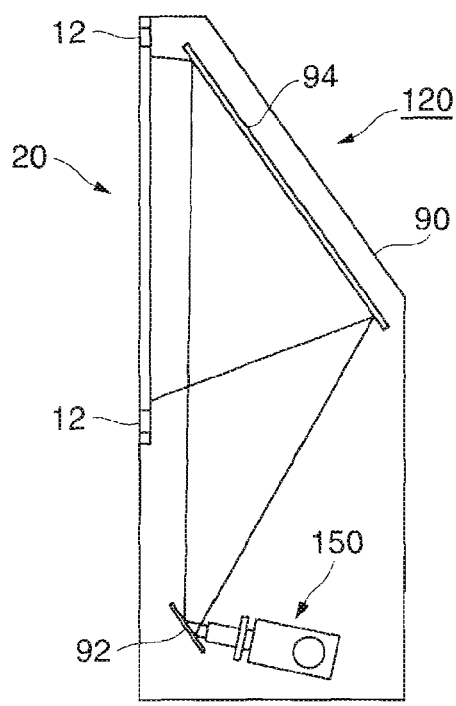
FIG. 1B is a view schematically illustrating the configuration of the rear projector according to the embodiment of the invention.

FIG. 1A is a perspective view schematically illustrating the configuration of a rear projector 120 according to a first embodiment of the invention, and FIG. 1B is a side sectional view illustrating the rear projector 120 shown in FIG. 1A. The rear projector 120 according to the present embodiment modulates light emitted from a light source by using a light modulation element and then projects the modulated light onto a screen 20 in an enlarged manner.

As shown in FIG. 1A, the rear projector 120 includes a casing 90 and the screen 20 which is mounted on a front-surface side of the casing 90 and onto which an image is projected. In addition, a front panel 88 is provided in the casing 90 below the screen 20, and openings 38 used to output sounds from speakers are provided at left and right sides of the front panel 88.

Next, the internal structure of the casing 90 of the rear projector 120 will be described.

As shown in FIG. 1B, a projection optical system 150 is disposed at a lower part of the casing 90 of the rear projector 120. Reflective mirrors 92 and 94 are disposed between the projection optical system 150 and the screen 20. Light beams emitted from the projection optical system 150 are reflected by the reflective mirrors 92 and 94 and are then projected onto the screen 20 in an enlarged manner.

Next, the schematic configuration of the projection optical system 150 of the rear projector 120 will be described.

Figure 2:
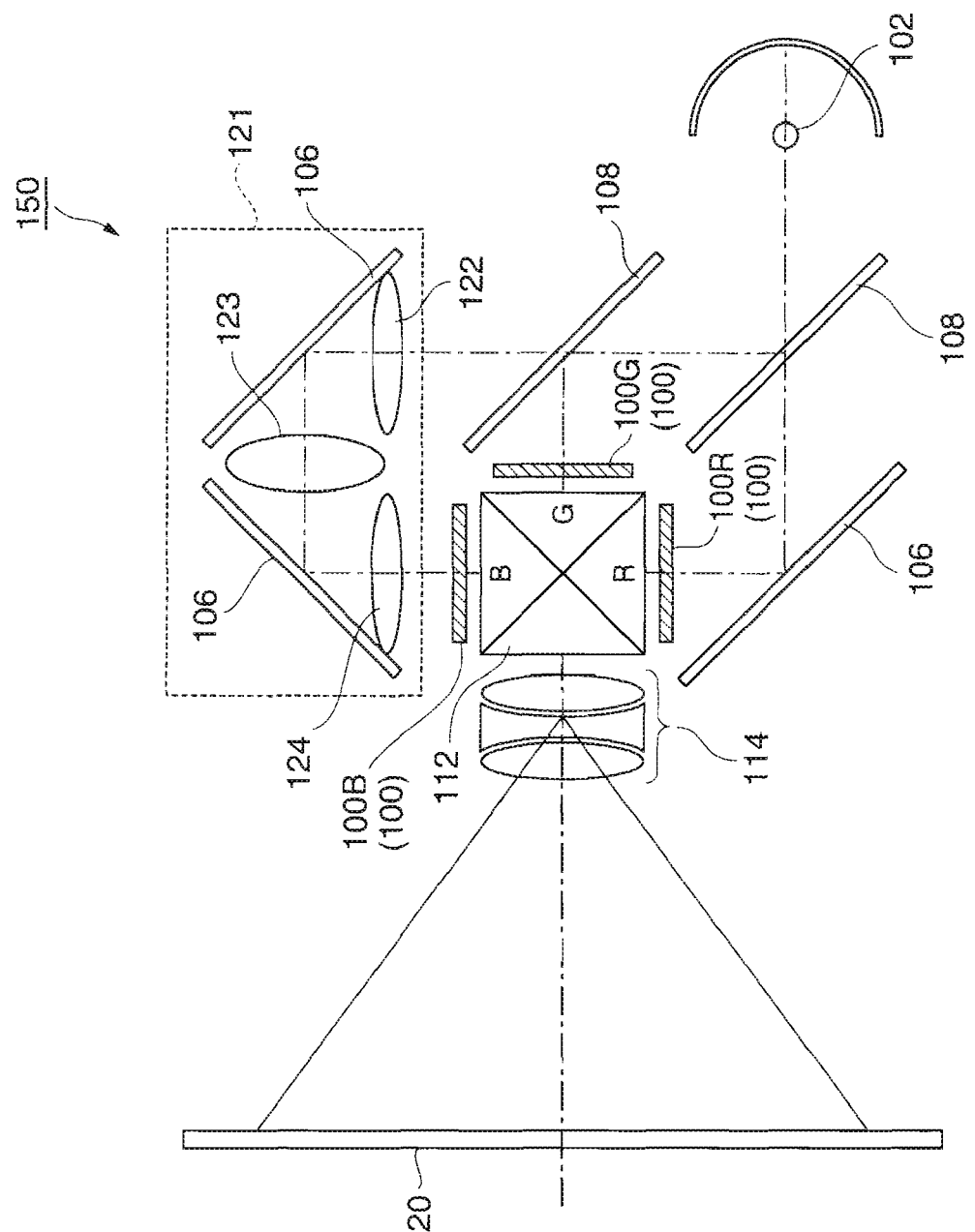
FIG. 2 is a view schematically illustrating the configuration of a projection optical system of the rear projector according to the embodiment of the invention.

FIG. 2 is a view schematically illustrating the configuration of the projection optical system 150 of the rear projector 120. In FIG. 2, the casing 90 that forms the rear projector 120 is omitted for simplicity of the figure.

As shown in FIG. 2, the projection optical system 150 includes a light source 102, light modulation elements 100 that modulate light beams emitted from the light source 102, and a projection lens 114 that projects the light beams modulated by the light modulation element 100. In the present embodiment, liquid crystal light valves 100R, 100G, and 100B are used as the light modulation elements 100.

The projection optical system 150 includes the light source 102, which is a white light source such as a halogen lamp. The light emitted from the light source 102 is separated into light beams corresponding to three primary colors of R (red), G (green), and B (blue) by three mirrors 106 and two dichroic mirrors 108 provided inside the projection optical system 150. Then, the separated light beams are guided to the liquid crystal light valves 100R (red), 100G (green), and 100B (blue) corresponding to the respective primary colors of R, G, and B. Here, the liquid crystal light valves 100R, 100G, and 100B are driven by signals that correspond to primary colors of R, G, and B and are supplied from an image signal processing circuit (not shown).

In addition, in the case of a light beam corresponding to a B (blue) color, an optical path is long as compared with a case of a light beam corresponding to R (red) or G (green). Accordingly, in order to prevent the loss, the light beam corresponding to the B (blue) color is guided through a relay lens system 121 having an incidence lens 122, a relay lens 123, and an emission lens 124.

Light beams modulated by the liquid crystal light valves 100R, 100G, and 100B are incident on a dichroic prism 112 from three directions (liquid crystal light valves 100R, 100G, and 100B), respectively. The dichroic prism 112 causes light beams corresponding to R and B colors to be refracted by 90° and a light beam corresponding to a G color to go straight, such that light beams from light emission parts of the liquid crystal light valves 100R, 100G, and 100B are mixed. Then, the mixed light obtained by mixing the light beams from the light emission parts is projected onto the screen 20 through a projection lens 114.

Configuration of Screen

Next, the schematic configuration of the screen 20 of the rear projector 120 will be described.

Figure 3:
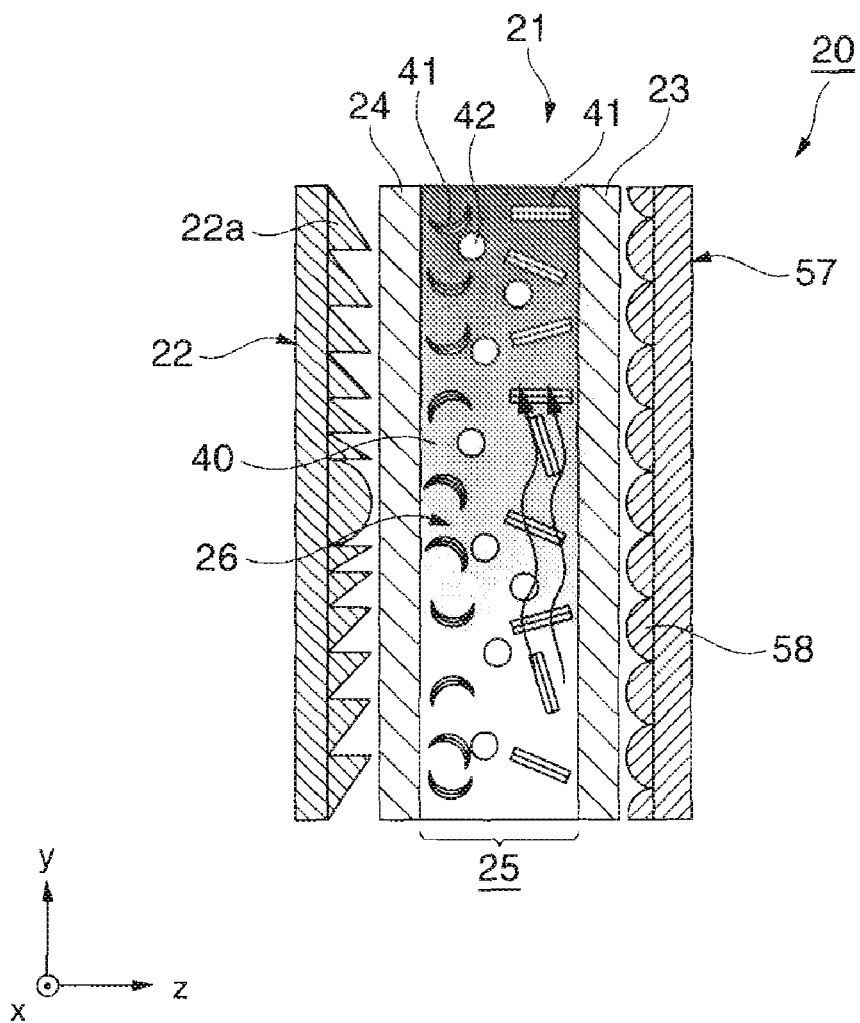
FIG. 3 is a cross-sectional view schematically illustrating the configuration of a screen according to a first embodiment of the invention.
Figure 4:
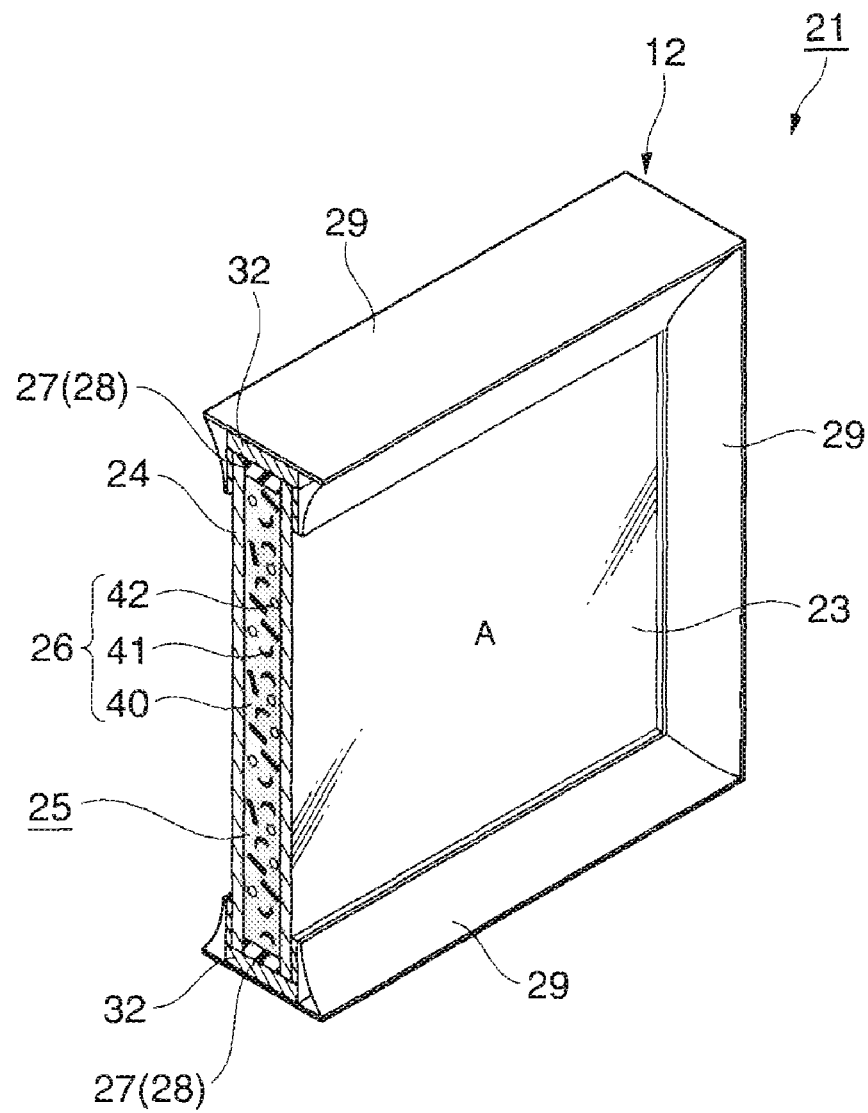
FIG. 4 is a cross-sectional perspective view schematically illustrating the configuration of a main screen body in the first embodiment of the invention.

FIG. 3 is a side sectional view schematically illustrating the configuration of the screen 20 in the focusing direction (z direction), and FIG. 4 is a perspective view illustrating a main body of the screen.

As shown in FIG. 3, the screen 20 includes a main screen body 21, a Fresnel lens sheet 22 having a Fresnel lens 22a, and a lenticular lens array 57 having a lenticular lens 58. The lenticular lens array 57, the main screen body 21, and the Fresnel lens sheet 22 are stacked on a path of projected light in this order from a viewer side.

In addition, a black mask (not shown) is formed in matrix on a viewer-side surface of the lenticular lens array 57. Moreover, it is possible to prevent dust or contaminants from being attached onto the screen 20 or the screen 20 from being damaged by providing a protective layer.

As shown in FIG. 4, the main screen body 21 is formed by filling a scattering body 26 serving to scatter projected light beams within a light scattering space 25 formed between a pair of light-transmissive plates 23 and 24. The pair of light-transmissive plates 23 and 24 have a size that allows a predetermined image region A to be secured and are rectangular shaped (may be square shaped) in plan view.

The light-transmissive plates 23 and 24 are formed of a glass, a light-transmissive resin, or the like. The thickness of each of the light-transmissive plates 23 and 24 depends on a size of a product that is applied. The main screen body 21 is sealed with a frame-shaped frame 12 shown in FIG. 4 and is then mounted on the casing 90 (refer to FIG. 1B).

Next, a sealing structure of the main screen body 21 will be described.

Figure 5:
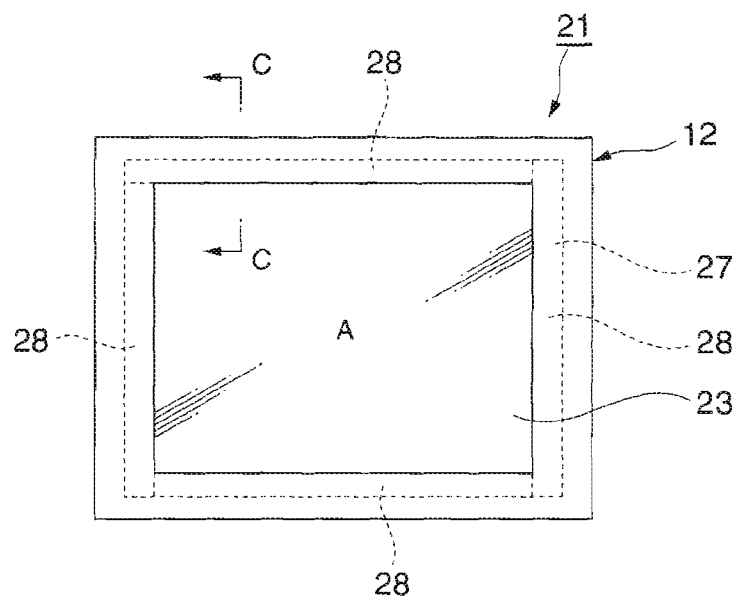
FIG. 5 is a view schematically illustrating a packing member of the main screen body in the first embodiment of the invention.
Figure 6:
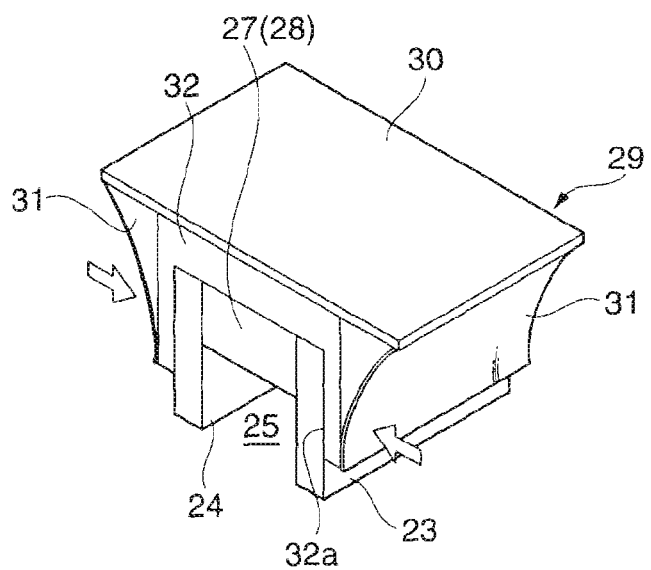
FIG. 6 is a cross-sectional view taken along the line VI-VI of FIG. 5.

FIG. 5 is a plan view illustrating the main screen body 21, where a packing member 27 is shown. FIG. 6 is a cross-sectional view taken along the line C-C of FIG. 5.

As shown in FIGS. 5 and 6, the periphery of the main screen body 21 is blocked by a packing member 27 that is provided to form the light scattering space 25 between the light-transmissive plates 23 and 24, the packing member 27 having a rectangular loop shape in plan view. The packing member 27 includes four prismatic packings 28. By causing a side of each of the packings 28 at one end thereof to face an end of another packing 28, the packing member 27 is formed in the rectangular loop shape so that a display region A shown in FIG. 5 can be secured.

Further, as shown in FIG. 6, the main screen body 21 is formed by holding the light-transmissive plates 23 and 24 and the packing member 27 by means of a spring member 29 under a state in which the packing member 27 is interposed between a lateral periphery between the light-transmissive plates 23 and 24 that are disposed opposite to each other with a predetermined gap therebetween. The spring member 29 includes a plate portion 30, which covers a lateral part of the main screen body 21, and a pair of elastic portions 31 that stand up from both sides of the plate portion 30 in the width direction thereof and are curved such that a gap between the elastic portions 31 becomes narrower toward front ends thereof. The light-transmissive plates 23 and 24 and the packing member 27 are fixed due to a pressing force of the elastic portions 31. The spring member 29 is provided at a lateral side of each of the light-transmissive plates 23 and 24. Under the state in which the respective spring members 29 are combined in the frame shape, the spring member 29 serves as the frame 12 shown in FIGS. 4 and 5. Due to the spring members 29, the light-transmissive plates 23 and 24 and the packing member 27 are held therebetween.

Furthermore, as shown in FIG. 6, by providing a buffering member 32 between the spring member 29 and the light-transmissive plates 23 and 24, appropriate pressure is applied and it is possible to prevent surfaces of the light-transmissive plates 23 and 24 from being damaged. The buffering member 32 having 'U' shape in cross-sectional view is formed in the frame shape. In addition, the buffering member 32 is mounted such that lateral sides of the light-transmissive plates 23 and 24 are inserted into a recessed portion 32a of the buffering member 32 along the circumferential direction thereof, the light-transmissive plates 23 and 24 having the packing member 27 interposed therebetween. Thus, it is possible to regulate positions of the light-transmissive plates 23 and 24 and packing member 27. As a result, the light-transmissive plates 23 and 24 and the packing member 27 can be temporarily fixed before the spring member 29 is mounted. In addition, since the respective members can be assembled without using adhesive, an assembly work becomes easy.

With the configuration described above, a closed space (light scattering space 25) is formed between the light-transmissive plates 23 and 24. Since the light scattering space 25 is completely closed in the case of using the sealing method described above, the scattering body 26 filled inside the light scattering space 25 does not leak.

Figure 9:
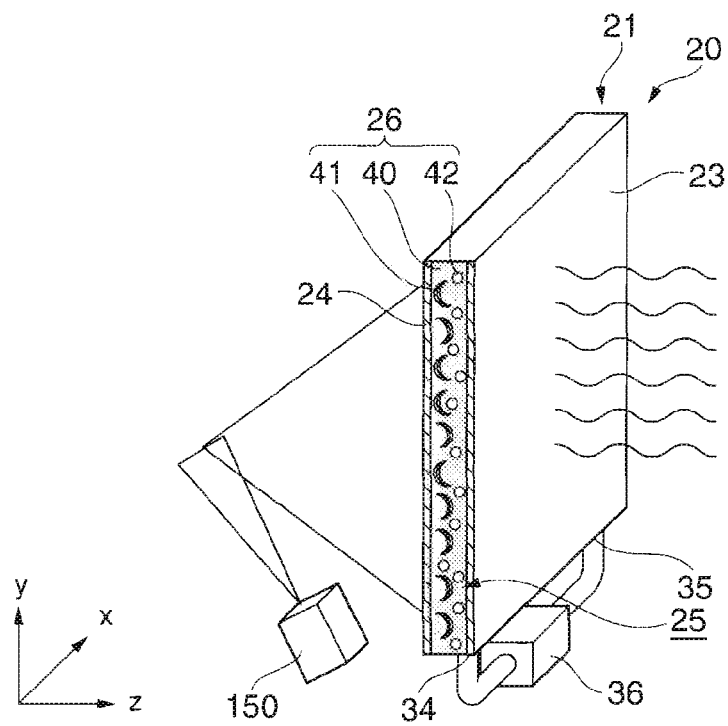
FIG. 9 is an explanatory view schematically illustrating the configuration of the screen according to the first embodiment of the invention.

Moreover, as shown in FIG. 9, the main screen body 21 includes an inlet 34 and an outlet 35, which communicate with the light scattering space 25, provided at both lower left and right sides of the main screen body 21. Further, the main screen body 21 includes a pump 36 (flowing unit) provided on a path where the inlet 34 and the outlet 35 communicate with each other at the outside of the light scattering space 25. In addition, the light scattering space 25 and the pump 36 are configured to communicate with each other. Preferably, the pump 36 is a rotary pump that is pretty silent.

As described above, the scattering body 26 is filled within the light scattering space 25. The scattering body 26 has a form of colloid by dispersing a plurality of spherically-shaped light scattering particles 42 and scattering fillers 41 (scattering components), which are deformable according to temperature change, in dispersion medium 40 (fluid) such as water.

As the light scattering particles 42, known materials may be used. Preferably, copolymer, such as silicon oxide, alumina, calcium carbonate, glass beads, and acrylic resin based materials, or amorphous organic materials such as silicon resin based materials are used.

Figure 7:
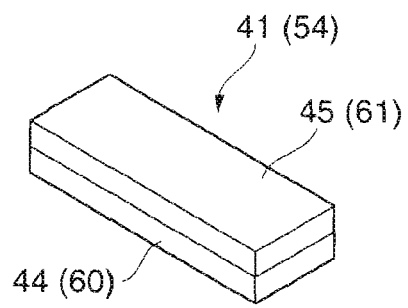
FIG. 7 is a view schematically illustrating the configuration of a scattering filler in the first embodiment of the invention.

Referring back to FIG. 7, each of the scattering fillers 41 is formed of a bimetal foil, has a rectangular shape in plan view, and is formed to be sufficiently smaller than a pixel. Specifically, the scattering filler 41 has a film shape formed of two different kinds of metal layers 44 and 45 having different rates of thermal expansion. That is, the scattering filler 41 includes a first metal layer 44 formed of zinc-copper alloy and a second metal layer 45 formed of iron-nickel alloy having a rate of thermal expansion smaller than that of the first metal layer 44. The plurality of scattering fillers 41 are formed by laminating a zinc-copper alloy plate and an iron-nickel alloy plate, which have sizes enough to form the plurality of scattering fillers 41 at a time, by cold welding, rolling the laminated plates in the film shape, and cutting the rolled plates in a predetermined fine shape. Thus, there are formed the scattering fillers 41 each including the first metal layer 44 and the second metal layer 45 having different rates of thermal expansion in the stacking direction thereof.

Figure 8A:
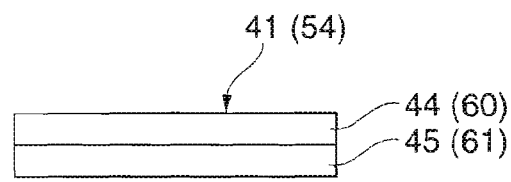
FIG. 8A is an explanatory view illustrating a deformation state of the scattering filler in the first embodiment of the invention.
Figure 8B:
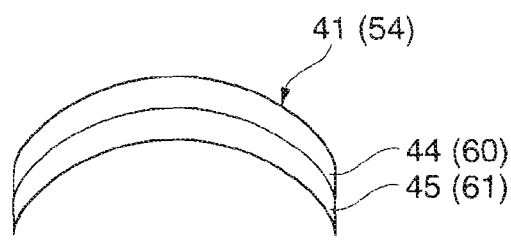
FIG. 8B is an explanatory view illustrating a deformation state of the scattering filler in the first embodiment of the invention.

As shown in FIGS. 8A and 8B, since the rate of thermal expansion of the first metal layer 44 formed of zinc-copper alloy is larger than that of the second metal layer 45 formed of iron-nickel alloy, the shapes of the scattering fillers 41 can be changed according to the temperature change therearound. For example, as temperature rises, the first metal layer 44 having a high rate of thermal expansion expands and the second metal layer 45 having a low rate of thermal expansion contracts, such that the scattering fillers 41 deform to be curved in the bow shape (refer to FIG. 8A). In contrast, as the temperature falls, the scattering fillers 41 deform to return to the original shape (refer to FIG. 8B). Thus, by using a thermal stress occurring due to a difference between the rates of thermal expansion of the laminated metal layers 44 and 45, it is possible to form the scattering fillers 41 that are freely deformable.

In addition, the viscosity of the scattering body 26 is appropriately set according to a characteristic of a desired product, since the viscosity of the scattering body 26 is determined by the dispersion density of the light scattering particles 42 and the scattering fillers 41. At this time, the light scattering particles 42 and the scattering fillers 41 are set to have a uniform dispersion rate.

As shown in FIG. 9, the scattering body 26 is transmitted at predetermined intervals by means of the pump 36 (flowing unit), which is provided on the path where the scattering body 26 flowing from the outlet 35 of the light scattering space 25 is guided back to the inlet 34, and circulate between the light scattering space 25 and the pump 36. As shown in the drawing, since the inlet 34 and the outlet 35 are positioned at both lower sides of the main screen body 21 in the left, and right direction (x direction) thereof, the scattering fillers 41 and the light scattering particles 42 flow in the light scattering space 25 in a complicated manner, and as a whole, the scattering body 26 flows in the left and right direction (x direction). Thus, since the scattering body 26 flows in the plane direction, defocusing of an image due to scattering of light or ghost does not occur.

Figure 10:
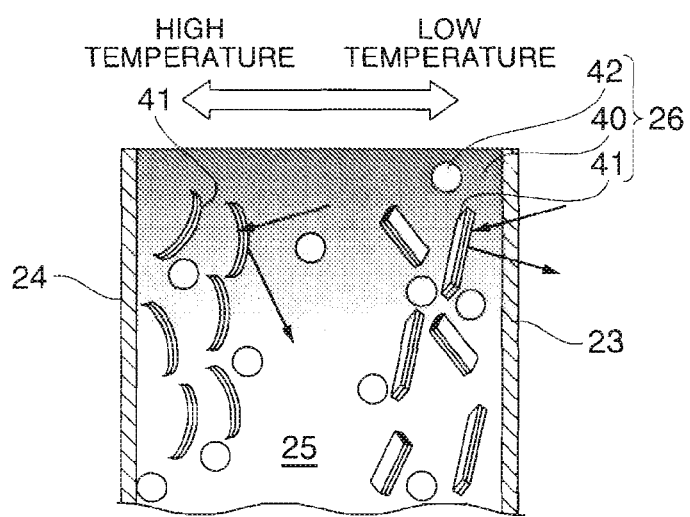
FIG. 10 is an explanatory view illustrating the temperature gradient within a light scattering space in the first embodiment of the invention.
Figure 11:
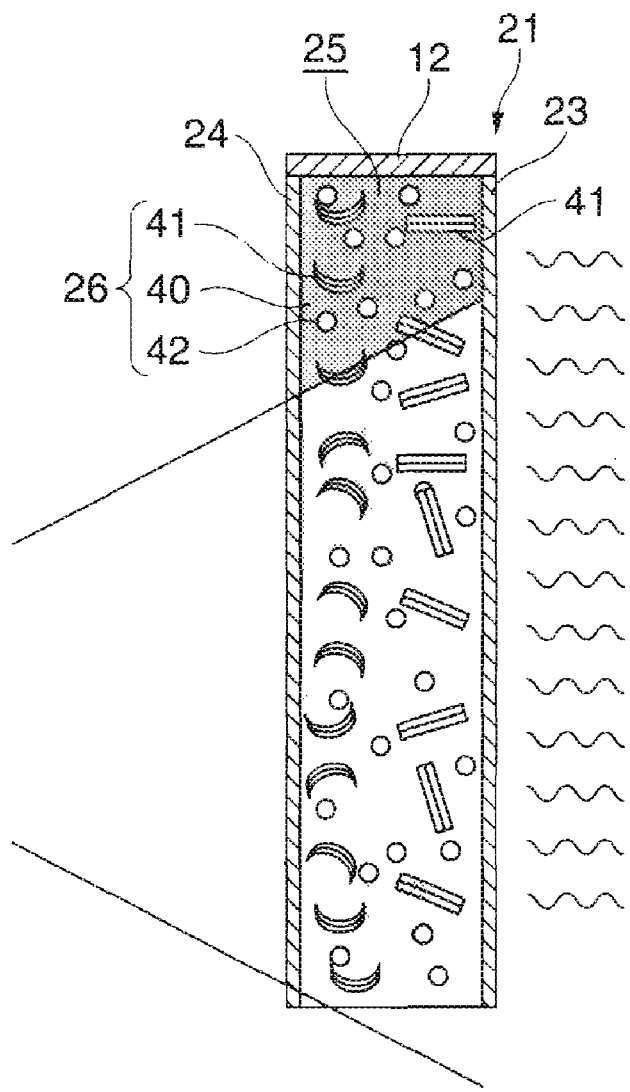
FIG. 11 is a side sectional view schematically illustrating the configuration of the main screen body in the first embodiment of the invention.

The screen 20 is mounted on the casing 90 such that a longitudinal direction of the lenticular lens 58 is vertical with respect to the horizontal direction, as shown in FIG. 1B. In the rear projector 120, since the inside of the casing 90 changes to high temperature due to driving of the projection optical system 150, for example, a difference between temperatures at a rear-surface side and a viewing side of the screen 20 mounted on the casing 90 occurs. That is, as shown in FIGS. 9 and 10, the temperature increases as closer to the light-transmissive plate 24 located at the rear-surface side from the light-transmissive plate 23 that is located at the viewing side and is adjacent to the air. Accordingly, within the light scattering space 25, the temperature gradient occurs in the focusing direction (z direction). In addition, since the dispersion medium 40 (scattering body 26) that is circulated by driving the pump 36 cools the light scattering space 25, heat is dissipated from the light-transmissive plate 23. Accordingly, it is possible to make large the temperature gradient within the light scattering space 25 in the focusing direction (z direction). As a result, as shown in FIG. 11, a potential occurring due to heating inside the casing 90 and heat exhausted from a surface of the screen acts, the scattering fillers 41 are surely deformed.

In addition, in FIG. 9, a rear-surface mirror serving to cause projected light beams from the projection optical system 150 to be flexed toward the screen 20 is omitted.

Next, the deformation of the scattering fillers 41 will be described in detail.

As described above, since the scattering body 26 filled within the light scattering space 25 is circulated by the pump 36, the light scattering particles 42 and the scattering fillers 41 move within the light scattering space 25 in the complicated manner according to the flow of the scattering body 26. At this time, the scattering fillers 41 move while deforming according to the temperature gradient within the light scattering space 25. As shown in FIG. 10, as the scattering fillers 41 move toward a high-temperature region (light-transmissive plate 24) within the light scattering space 25, the scattering fillers 41 deform to be curved with the second metal layer 45 having a low rate of thermal expansion as an inner side. As the scattering fillers 41 move toward a low-temperature region (light-transmissive plate 23), the scattering fillers 41 return to the plate shapes. Due to the scattering fillers 41 that move within the light scattering space 25 in the plane direction while repeating the deformation described above and the light scattering particles 42 that move in the same manner as the scattering fillers 41, the scattering state of projected light changes with time in a variety of manners. Then, interference fringes of projected light beams that are viewed move or a pattern of the interference fringes changes in a complicated manner. Accordingly, since the light beams are integrated and averaged due to an afterimage effect (afterimage characteristic) of a viewer, the scintillation is effectively reduced.

Even though the afterimage characteristic of human eyes and a condition thereof varies depending on a person, the afterimage time in the case of typical indoor brightness is about 20 ms. Accordingly, by adjusting the flow speed of the scattering body 26 by the use of the pump 36, the scattering fillers 41 frequently come and go between a high-temperature region and a low-temperature region within the light scattering space 25 while moving in the plane direction of the screen, which causes the scattering fillers 41 to repeatedly deform and return. As a result, projected light beams are scattered and diffracted, and the pattern of interference fringes occurring due to the scattering and diffraction of the projected light beams changes in a variety of manners at a speed equal to or larger than the afterimage time of human eyes. Then, the interference fringes are averaged when viewed within visual response time, and as a result, a viewer recognizes like the brightness of an image is even. That is, since the image is held for a predetermined period of time due to the afterimage characteristic of human eyes, the entire screen is evenly displayed to be viewed.

Thus, in the case when the scattering fillers 41 that are deformable according to the temperature change repeatedly deform and return, a diffraction angle changes in a complicated manner. Furthermore, since the scattering fillers 41 and the light scattering particles 42 move within the light scattering space 25, relationship between relative positions of the scattering fillers 41 and the light scattering particles 42 changes, and accordingly, the diffraction angle can change in a more complicated manner. In this case, change of a pitch between the interference fringes and positional change thereof increase. As a result, since the interference fringes are not visible, glaring of an image is suppressed. This means that the scintillation is reduced, which allows an image with high brightness, high resolution, and high quality to be obtained. Since the scattering body 26 is circulated continuously within the light scattering space 25, it is possible to reliably change the scattering state of projected light over a long period of time. Thus, it is possible to maintain an effect of reducing the scintillation. In addition, since the scattering body 26 flows, as a whole, in the plane direction of the screen, an image is not defocused.

Moreover, deformation of the scattering fillers 41 changes depending on a condition. For example, the speed at which the scattering fillers 41 deform may be slow by means of the temperature gradient within the light scattering space 25. However, the scattering body 26 held within the light scattering space 25 in the main screen body 21 is a volume scattering body having a thickness in the focusing direction. Accordingly, even if the deformation of the scattering fillers 41 is slow, the positional relationship among the light scattering particles 42 changes in a variety of manners due to the deformation of the scattering fillers 41. As a result, it is possible to change a pattern of interference fringes at sufficiently high speed with respect to the afterimage time of human eyes. Thus, it is possible to eliminate a specific pattern of interference fringes from being visible. That is, even though deformation of each scattering filler is slow, it is possible to show an effective scattering result as a whole, since deformation of a plurality of scattering fillers overlapping in the focusing direction acts.

In the present embodiment, projected light beams are scattered and diffracted by the scattering fillers 41 and the light scattering particles 42 that are freely deformable according to the temperature change. Accordingly, it is not necessary to move a screen unlike a related art and to change the pattern of interference fringes with low energy and low noises. As a result, since it is possible to obtain an image with high brightness, high resolution, and high quality while saving cost, it is possible to realize a high-performance product.

Alternatively, the deformation and returning of the scattering fillers 41 may be quickly performed at a speed equal to or smaller than the afterimage time of human eyes in order to prevent interference fringes.

Furthermore, the main screen body 21 is sealed by the use of the packing member 27 and the spring member 29 without leaking, such that performance stability is secured over a long period of time.

In addition, the rear projector 120 may include a cooling unit that dissipates heat generated within the casing 90. In the case when, for example, a fan is provided as the cooling unit, high-temperature fan airflow is circulated within the casing 90, and accordingly, the temperature distribution within the casing 90 becomes uniform. This prevents a temperature difference from occurring in the plane direction of the light-transmissive plate 24, and accordingly, a high-temperature region in the light scattering space 25 is secured over the plane direction. As a result, since it is possible to prevent the deformation of the scattering fillers 41 from being uneven in the plane direction of the screen 20, the scintillation can be reduced more reliably.

In addition, the inlet 34 and the outlet 35 are disposed at both sides of the main screen body 21 in the left and right direction (x direction) thereof in the present embodiment. However, the inlet 34 and the outlet 35 may be disposed at both sides of the main screen body 21 in the vertical direction (y direction) thereof.

In addition, it may be possible to cause the temperature gradient to occur in the light scattering space 25 more positively by using a heating unit, such as a heater. In addition, even though the shapes of the light scattering particles 42 are spherical in the present embodiment, the shapes of the light scattering particles 42 are not limited thereto. For example, the shapes of the light scattering particles 42 may be irregular.

Second Embodiment

Figure 12:
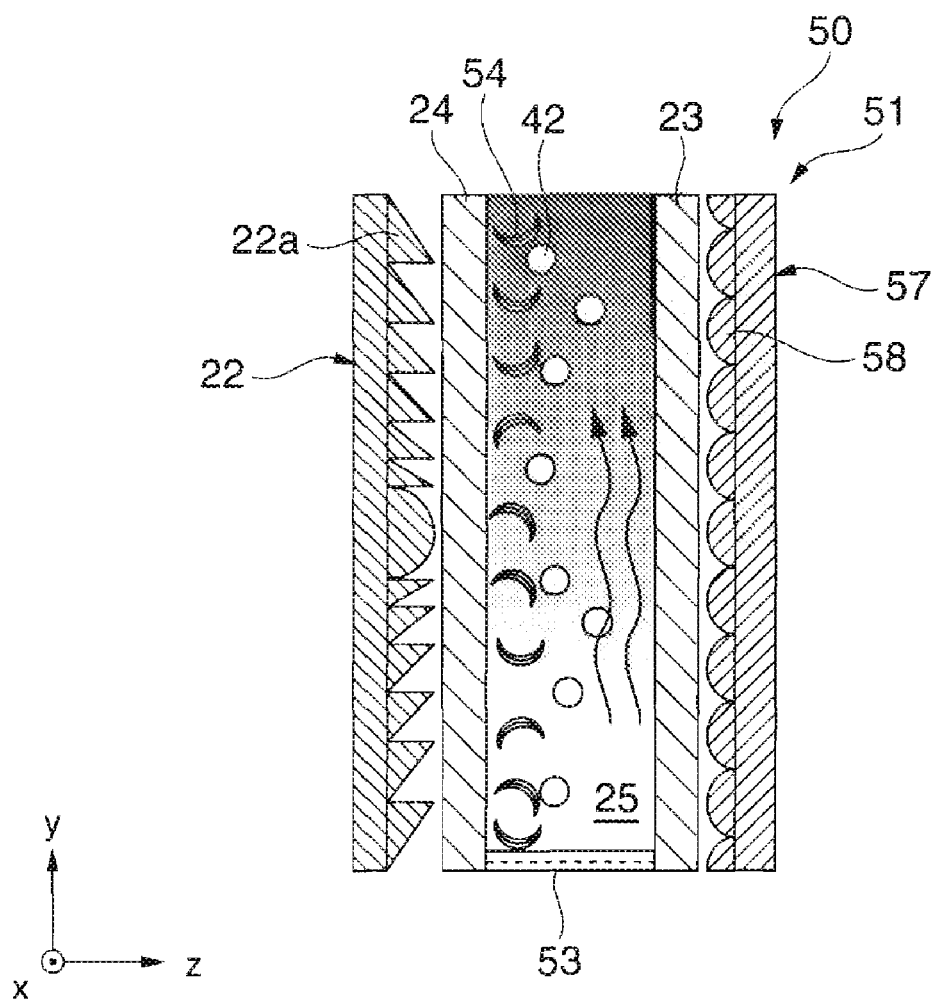
FIG. 12 is a side sectional view schematically illustrating the configuration of a main screen body in a second embodiment of the invention.

The basic configuration of a rear projector according to a second embodiment, which will be described below, is the same as that, in the first embodiment except for the configuration of a screen in the first embodiment. Therefore, only the configuration of a screen will be described and an explanation on common parts will be omitted. Moreover, in FIGS. 12 to 15, 16A, and 16B, the same constituent components as in FIGS. 1A to 11 are denoted by the same reference numerals. In addition, as shown in FIG. 12, a screen 50 in the present embodiment is formed by stacking a lenticular lens array 57 and a Fresnel lens sheet 22, which are the same as in the first embodiment, on a main screen body 51.

Figure 13:
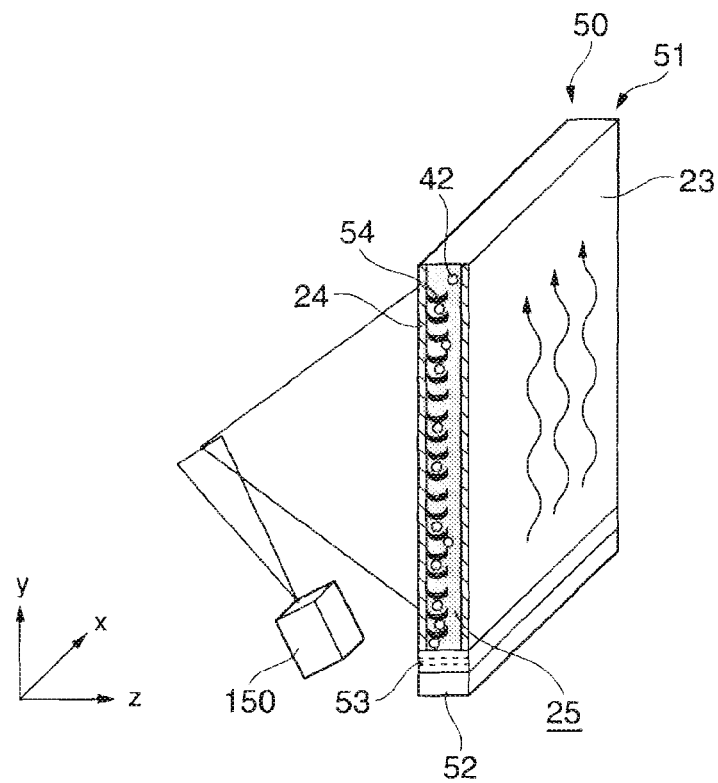
FIG. 13 is an explanatory view schematically illustrating the configuration of a screen according to the second embodiment of the invention.

As shown in FIG. 13, the main screen body 51 in the present embodiment is configured to include a heater 52 (heating unit) provided below a light scattering space 25. The heater 52 can uniformly heat a lower part of the main screen body 51 in the left and right direction (x direction) thereof. As shown in FIG. 12, the heater 52 serves to evaporate low-boiling-point liquid 53 (fluid) sealed within the light scattering space 25. Further, within the light scattering space 25 filled with vapor (fluid), there exists a plurality of scattering fillers 54 that are uniformly distributed and fixed on the entire inner surface of the light-transmissive plate 24. In addition, even in FIG. 13, a rear-surface mirror serving to cause projected light beams from the projection optical system 150 to be flexed toward the screen 50 is omitted.

The scattering fillers 54 are formed to be sufficiently smaller than a pixel and have rectangular shapes in plan view. Referring back to FIG. 7, each of the scattering fillers 54 has a film shape including two different kinds of resin layers 60 and 61 whose coefficients of hygroscopic expansion (expansion and contraction) are different from each other. Specifically, each of the scattering fillers 54 is configured to include the first resin layer 60 and the second resin layer 61 having a coefficient of hygroscopic expansion smaller than that of the first resin layer 60. For example, materials of the first resin layer 60 include polyimide having a coefficient of hygroscopic expansion of 18 ppm° CRH, polyethyleneterephthalate (PET) having a coefficient of hygroscopic expansion of 10 ppm° CRH, and the like. In addition, materials of the second resin layer 61 include a liquid crystal polymer film (LCP) whose moisture absorptivity is very low and the like. Thus, there are formed the scattering fillers 54 each including the first resin layer 60 and the second resin layer 61 having different coefficients of hygroscopic expansion in the stacking direction thereof.

Since the first resin layer 60 has a high coefficient of hygroscopic expansion as compared with the second resin layer 61, the shapes of the scattering fillers 54 can be changed according to the temperature change therearound. For example, as shown in FIGS. 8A and 8B, as humidity increases, the first resin layer 60 having a high coefficient of hygroscopic expansion expands, and accordingly, the second resin layer 61 having a low coefficient of hygroscopic expansion is flexed, such that the scattering fillers 54 deform to be curved in the bow shape (refer to FIG. 8A). In contrast, as the humidity decreases, the scattering fillers 41 deform to return to the original shape (refer to FIG. 8B). That is, as the humidity decreases, the first resin layer 60 contracts while evaporating absorbed moisture, and thus the first resin layer 60 returns to the original shape. The second resin layer 61 is deformed according to change of the shape of the first resin layer 60. Thus, by using a hygroscopic stress occurring due to a difference between coefficients of hygroscopic expansion of the resin layers 60 and 61, it is possible to cause the scattering fillers 54 to deform freely.

Figure 14:
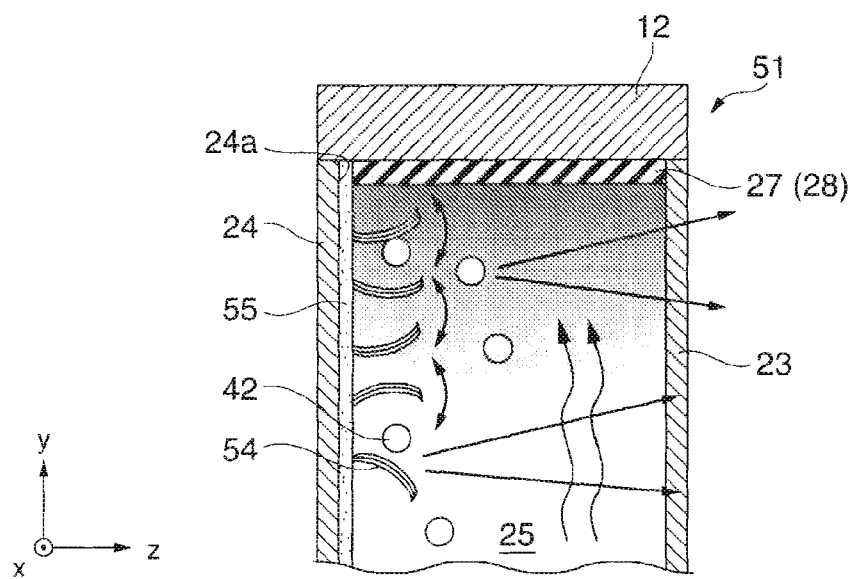
FIG. 14 is an enlarged view schematically illustrating the configuration of main parts of the main screen body in the second embodiment of the invention.

As shown in FIG. 14, the scattering fillers 54 are uniformly disposed and fixed on an entire inner surface 24a (surface of the light-transmissive plate 24 facing the light scattering space) of the light-transmissive plate 24 having an adhesive layer 55 thereon. The scattering fillers 54 are disposed not to overlap each other under a state (horizontal state) in which longitudinal directions of the scattering fillers 54 follow the z direction. In addition, one ends of the scattering fillers 54 in the longitudinal directions thereof are adhered and fixed onto the inner surface 24a of the light-transmissive plate 24. Thus, the scattering fillers 54 are uniformly disposed in the plane direction of the screen and are provided to be freely deformable without interfering with each other.

Further, the plurality of light scattering particles 42 is disposed within the light scattering space 25. These light scattering particles 42 are free to float along the flow of vapor within the light scattering space 25.

Figure 15:
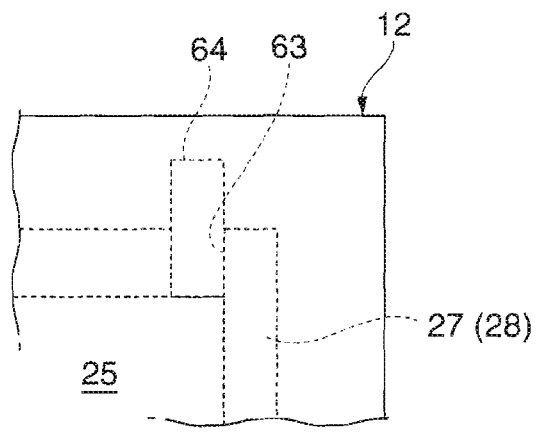
FIG. 15 is an enlarged view illustrating a maintenance unit in the second embodiment.

As shown in FIG. 15, in the main screen body 51, preferably, the light scattering space 25 communicates with the outside by means of a through hole 63 provided beforehand in the packing member 27. In general, a rubber plug 64 is detachably inserted into the through hole 63, such that the rubber plug 64 functions as a maintenance unit that is used to inject liquid 53 into the light scattering space 25 or discharge the liquid 53 from the light scattering space 25.

In the main screen body 51 having the configuration described above, as shown in FIGS. 13 and 14, heating performed by the heater 52 is controlled every time, such that the humidity within the light scattering space 25 fluctuates. For example, the heater 52 operates for a predetermined period of time to evaporate the low-boiling-point liquid 53 and then the heater 52 stops operating when an amount of vapor within the light scattering space 25 reaches a saturated state. Then, when the humidity within the light scattering space 25 decreases up to a predetermined level, the heater 52 operates again to evaporate the liquid 53. By controlling the operation of the heater 52 in such manner, temporal humidity gradient occurs within the light scattering space 25. That is, the 'fluctuation' means that the humidity within the light scattering space 25 changes with time.

As described above, the scattering fillers 54 deform to be curved and return to original shapes while repeatedly absorbing moisture and evaporating moisture according to the humidity change (fluctuation of humidity) within the light scattering space 25, and accordingly, the light scattering particles 42 move. This causes the scattering state of projected light to change in a variety of manners. Thus, interference fringes that are viewed move or a pattern of the interference fringes changes in a complicated manner at a speed equal to or larger than afterimage time of human eyes. As a result, the projected light beams are integrated and averaged due to the afterimage characteristic of human eyes, such that the interference fringes are not visible.

Figure 16A:
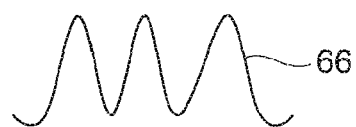
FIG. 16A is an explanatory view illustrating another example of a scattering filler and a deformation state thereof.
Figure 16B:
FIG. 16B is an explanatory view illustrating another example of a scattering filler and a deformation state thereof.

Furthermore, as shown in FIGS. 16A and 16B, the scattering filler may be a piece of film having a shape of down sufficiently smaller than a pixel. A scattering filler 66 has an initial shape shown in FIG. 16A by hot press, for example, and expands as the humidity increases (refer to FIG. 16B).

In addition, for example, volatile liquid such as alcohol may be used as the low-boiling-point liquid. In this case, since the volatile liquid easily evaporates by reducing the pressure of the light scattering space 25, it is not necessary to prepare a heating unit, such as the heater 52. As a result, cost can be saved since the number of components decreases, and the main screen body 51 can be made small.

In addition, the scattering fillers may be configured to float within the light scattering space 25.

Third Embodiment

Next, a third embodiment of the invention will be described with reference to the accompanying drawings.

In the present embodiment, an image display apparatus uses a scanning part instead of a light modulation element. In addition, the other configuration of a screen is the same as that in the first embodiment. Accordingly, the same constituent components as in the first embodiment are denoted by the same reference numerals, and detailed explanation thereof will be omitted.

Figure 17:
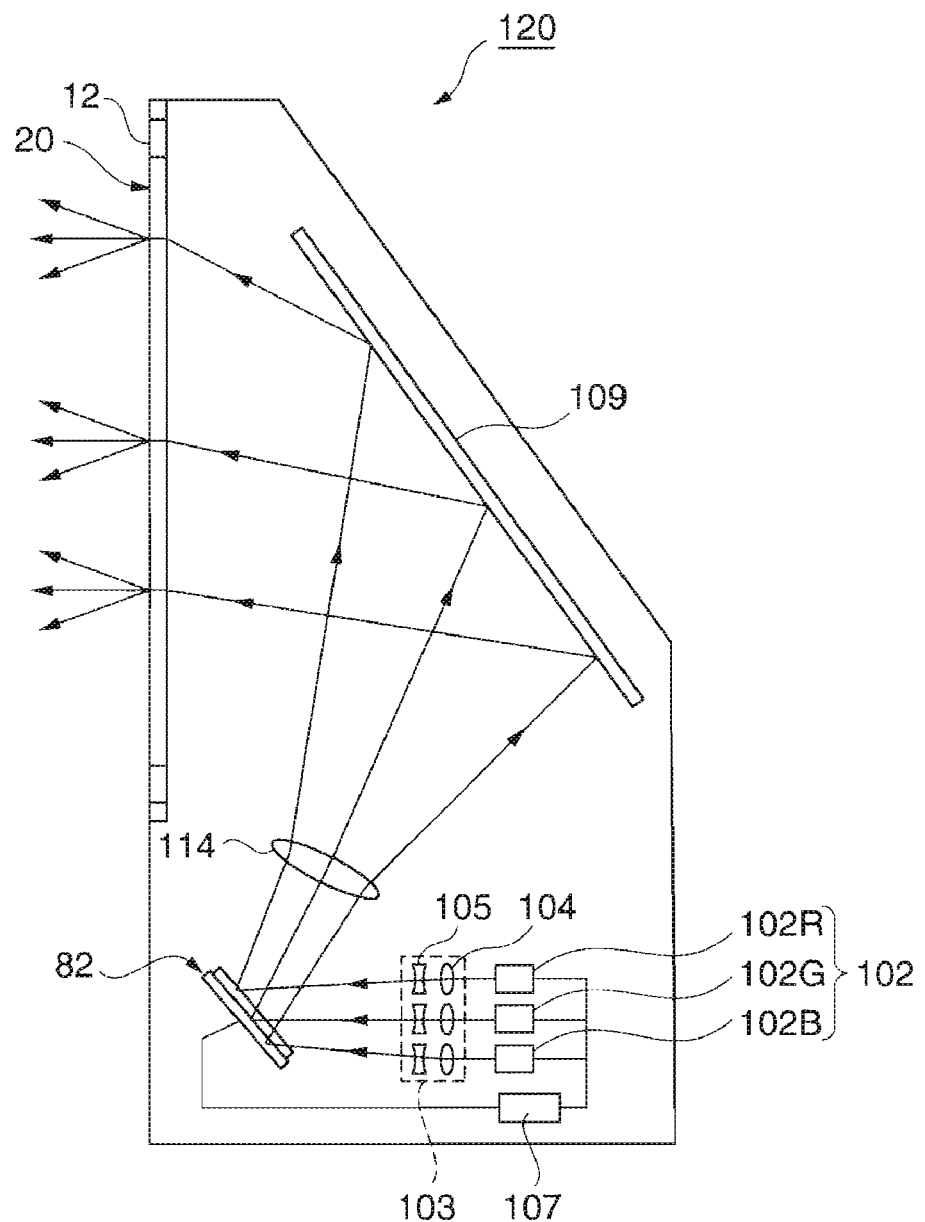
FIG. 17 is a view schematically illustrating the configuration of a rear projector according to a third embodiment of the invention.
Figure 18A:
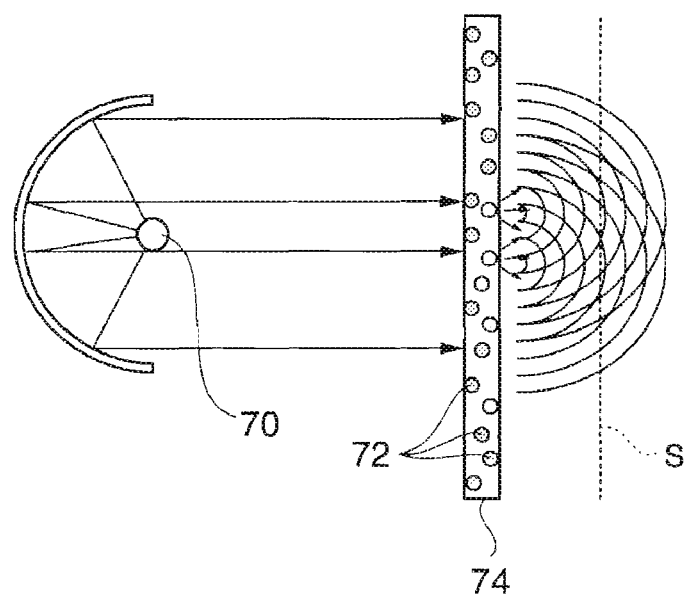
FIG. 18A is a view explaining the principle of occurrence of scintillation.
Figure 18B:
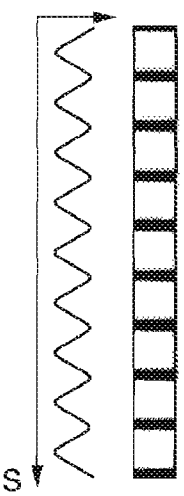
FIG. 18B is a view explaining the principle of occurrence of scintillation.

FIG. 17 is a cross-sectional view schematically illustrating the configuration of a rear projector 120 (image display apparatus). As shown in FIG. 17, the rear projector 120 according to the present embodiment includes a light source 102 that emits laser beams, a lens optical system 103 having a collimate optical system 104 and a beam shaping optical system 105, a scanner 82 that scans incident laser beams in the two-dimensional direction, a projection lens 114 that projects scanned light in an enlarged manner, and a reflective mirror 109 that reflects the projected light toward a screen 20. The light source 102 has a red laser diode 102R that emits a red-colored laser beam, a green laser diode 102G that emits a green-colored laser beam, and a blue laser diode 102B that emits a blue-colored laser beam.

Laser beams emitted from the laser diodes 102R, 102G, and 102B are incident on the scanner 82 through the lens optical system 103. The incident laser beams are scanned in the two-dimensional direction by the scanner 82 and are then projected onto the screen 20 through the projection lens 114 and the reflective mirror 109. Thus, the rear projector 120 according to the present embodiment forms an image by causing the scanner 82 to scan the laser beams emitted from the light source 102 onto the screen 20.

As described in the present embodiment, even in the scan-type rear projector 120 using a laser light source, the scattering body 26 including the light scattering particles 42 flows within the screen 20. Accordingly, since the same operations and effects described in the above embodiments can be obtained, it is possible to effectively reduce the scintillation.

Having described the preferred embodiments of the invention referring to the accompanying drawings, it should be understood that the invention is not limited to those embodiments. The constituent components and combination thereof shown in the embodiments described above are only examples and various changes and modifications thereof could be made within a range not departing from the spirit or scope of the invention.

In the embodiments described above, the screen 20 having the configuration is applied to the rear projector 120. However, the screen 20 having the configuration described above may be applied to a screen of a front projection type projector.

Furthermore, in the embodiments described above, examples of using a transmissive liquid crystal light value as a light modulation element are shown. However, a reflective liquid crystal light value and a micro-mirror array device may be used as a light modulation element. In this case, the configuration of the projection optical system is appropriately changed.

In addition, diameters, refractive indexes, distribution density, and the like of the light scattering particles 42 may be appropriately adjusted. In addition, by using, for example, water as inclusion, it is possible to save cost while considering environment. In addition, scattering components are not limited to solid dispersoids, such as the light scattering particles 42. For example, the scattering components may be liquid-type dispersoids, such as emulsion (liquid emulsion), obtained by emulsifying and dispersing oil in water.

The entire disclosure of Japanese Patent Application No. 2006-164649, filed Jun. 14, 2006 is expressly incorporated by reference herein.

What is claimed is:

1. A screen that receives projected light beams to display an image, comprising:
    a plurality of light-transmissive plates having optical transparency;
    a fluid that is disposed within a light scattering space formed between the light-transmissive plates and contains at least one of gas and liquid; and
    scattering components that are disposed within the light scattering space and are deformable according to temperature change of the fluid, and
    wherein each of the scattering components is a filler including a plurality of metal layers having different coefficients of thermal expansion.

2. The screen according to claim 1, wherein the scattering components move along flow of the fluid.

3. The screen according to claim 1, wherein the scattering components are fixed within the light scattering space.

4. The screen according to claim 1, further comprising:
    a flowing unit that causes the fluid to flow within the light scattering space.

5. The screen according to claim 1, further comprising:
    a heating unit that heats the fluid,
    wherein the fluid is liquid.

6. The screen according to claim 1, wherein each of the scattering components is smaller than a pixel.

7. A rear projector comprising:
    a light source that emits light beams;
    a light modulation element that modulates the light beams emitted from the light source;
    the screen according to claim 1; and
    a projection unit that projects the light beams modulated by the light modulation element onto the screen.

8. An image display apparatus comprising:
    a light source that emits light beams;
    the screen according to claim 1; and
    a scanning unit that scans the light beams emitted from the light source onto the screen.

9. A screen that receives projected light beams to display an image, comprising:
    a plurality of light-transmissive plates having optical transparency;
    a fluid that is disposed within a light scattering space formed between the light-transmissive plates and contains at least one of gas and liquid; and
    scattering components that are disposed within the light scattering space and are deformable according to a humidity change of the fluid.

10. The screen according to claim 9, wherein each of the scattering components is a filler including a plurality of resin layers having different coefficients of hygroscopic expansion.

* * * * *